United States Patent
Mustafa

(10) Patent No.: US 12,050,717 B1
(45) Date of Patent: Jul. 30, 2024

(54) METHOD AND SYSTEM FOR MAPPING KNOWLEDGE OBJECTS FOR DATA COMPLIANCE

(71) Applicant: CAPEIT.ai, inc., San Jose, CA (US)

(72) Inventor: Tarique Mustafa, San Jose, CA (US)

(73) Assignee: CAPEIT.AI, INC., San Jose, CA (US)

(*) Notice: Subject to any disclaimer, the term of this patent is extended or adjusted under 35 U.S.C. 154(b) by 0 days.

(21) Appl. No.: 18/367,083

(22) Filed: Sep. 12, 2023

Related U.S. Application Data

(60) Provisional application No. 63/474,770, filed on Sep. 13, 2022.

(51) Int. Cl.
  *G06F 21/00* (2013.01)
  *G06F 21/62* (2013.01)

(52) U.S. Cl.
  CPC .. *G06F 21/6254* (2013.01); *G06F 2221/2113* (2013.01); *G06F 2221/2141* (2013.01)

(58) Field of Classification Search
  CPC ......... G06F 21/6254; G06F 2221/2113; G06F 2221/2141
  See application file for complete search history.

(56) References Cited

U.S. PATENT DOCUMENTS

| | | | |
|---|---|---|---|
| 10,902,081 B1* | 1/2021 | Gassner | G06Q 10/103 |
| 2013/0145348 A1* | 6/2013 | Agovic | G06F 8/70 |
| | | | 707/610 |
| 2020/0167323 A1* | 5/2020 | Swamy | G06F 16/256 |

FOREIGN PATENT DOCUMENTS

WO WO-2018104834 A1 * 6/2018 ............. G06F 1/163

OTHER PUBLICATIONS

Castano et al., "Global viewing of heterogeneous data sources", IEEE Transactions on Knowledge and Data, vol. 13, Issue 2 (Year: 2001).*

* cited by examiner

*Primary Examiner* — Morshed Mehedi
(74) *Attorney, Agent, or Firm* — WOMBLE BOND DICKINSON (US) LLP

(57) ABSTRACT

A system receives a plurality of knowledge objects (KOs). The system receives repository structure definition information, the repository structure definition information specifying one or more repository structure definitions that define respective structures for the one or more data repositories. The system groups the plurality of KOs based on the name, type, and tag attributes of the KOs, and storage paths of the underlying unit of structured, semi-structured, and unstructured data at the one or more data repositories corresponding to the KOs to generate a number of groups of KOs. For each group in the groups of KOs, the system determines a count of KOs in the group. The system generates multiple mapping structures with M to N relationships between the groups of KOs to the one or more repository structure definitions, the mapping relationship including the count of associated KOs.

20 Claims, 15 Drawing Sheets

300

| Entity ID 301 | Entity Name 302 | Entity Title 303 | Entity Department 304 |

FIG. 3

| Repository ID 401 | Repository Class 402 | Repository Type 403 | Repository Location 404 | Name 405 | Branch/Account 406 | Transport/Protocol 407 | Authentication Credentials 408 | Date Created 409 | Date Updated 410 | Progress 411 |
|---|---|---|---|---|---|---|---|---|---|---|

| Type 501 | Name 502 | Value 503 | Verify 504 | Sizeof 505 | Structure 506 | Tag 507 | Enabled 508 | LastModified 509 | Storage Location 510 |
|---|---|---|---|---|---|---|---|---|---|

1. α-Knowledge Object: /601

{
"type": "Lexeme",
"name":
"value":
"verify":
"sizeof": NULL,
"structure": NULL
"tag":
}

2. β-Knowledge Object: /602

{
"type": "RegEx",
"name":
"value":
"verify":
"sizeof": <Integer>
"structure": <α|ν|α>
"tag":
}

3. ε-Knowledge Object: /603

{
"type": "Expression",
"name":
"value":
"verify":
"sizeof": NULL,
"structure": NULL
"tag":
}

4. ν-Knowledge Object: /604

{
"type": "Lexeme",
"name":
"value":
"verify":
"sizeof": NULL,
"structure": NULL
"tag":
}

FIG. 6

α-Object

{
 "type": "Lexeme",
 "name": "SSN",
 "value": "SSN",
 "verify": "Lexical_Match",
 "sizeof": NULL,
 "structure": NULL,
 "tag": "NationalID",
}

FIG. 7A

β-Object

{
 "type": "RegEx",
 "name": "AustriaSVNR",
 "value": "[0-9]{10}",
 "verify": "AustriaSVNR_Algo",
 "sizeof": 10,
 "structure": NUMERIC,
 "tag": "NationalID",
}

FIG. 7B

ε-Object

{
 "type": "Expression",
 "name": "Bank_Statement",
 "value": "SSN AND IBAN (NEAR)(20)",
 "verify": "Graph_Algo",
 "sizeof": NULL,
 "structure": NULL,
 "tag": "Banking_Finance",
}

FIG. 7C

METHOD AND SYSTEM FOR MAPPING KNOWLEDGE OBJECTS FOR DATA COMPLIANCE

RELATED APPLICATIONS

This application claims the benefit of U.S. provisional patent application No. 63/474,770, filed Sep. 13, 2022, which is incorporated by reference herein in its entirety.

TECHNICAL FIELD

Embodiments of the invention relate generally to data privacy and data protection. More particularly, embodiments of the invention relate to mapping knowledge objects for data privacy and data protection compliance.

BACKGROUND

Traditional database structures and schemas as captured in the table metadata had very specific objective and purpose, i.e., (1) to provide higher level of Abstraction, (2) to specify which column corresponds to what specific data items (last name, first name, phone number, etc.), and (3) to provide vocabulary to facilitate relational operations (such as creating join, referential integrity, etc.).

While metadata or data catalog of the traditional database are used to define associative queries, join queries, and pivotal tabular data for analytics and report generation, using metadata and data catalog from a traditional database for data compliance tasks imposes a restriction on the ability to provide information that is not derivable from the metadata or data catalog of the traditional database.

BRIEF DESCRIPTION OF THE DRAWINGS

Embodiments of the invention are illustrated by way of example and not limitation in the figures of the accompanying drawings in which like references indicate similar elements.

FIG. 3 is a block diagram illustrating an example of attributes for an entity according to one embodiment.

FIG. 4 is a block diagram illustrating an example of a repository structure definition according to one embodiment.

FIG. 5 is a block diagram illustrating an example of attributes for a knowledge object according to one embodiment.

FIG. 6 shows some types of knowledge objects according to some embodiments.

FIGS. 7A-7C show certain examples of knowledge objects according to some embodiments.

DETAILED DESCRIPTION

Figure 1:
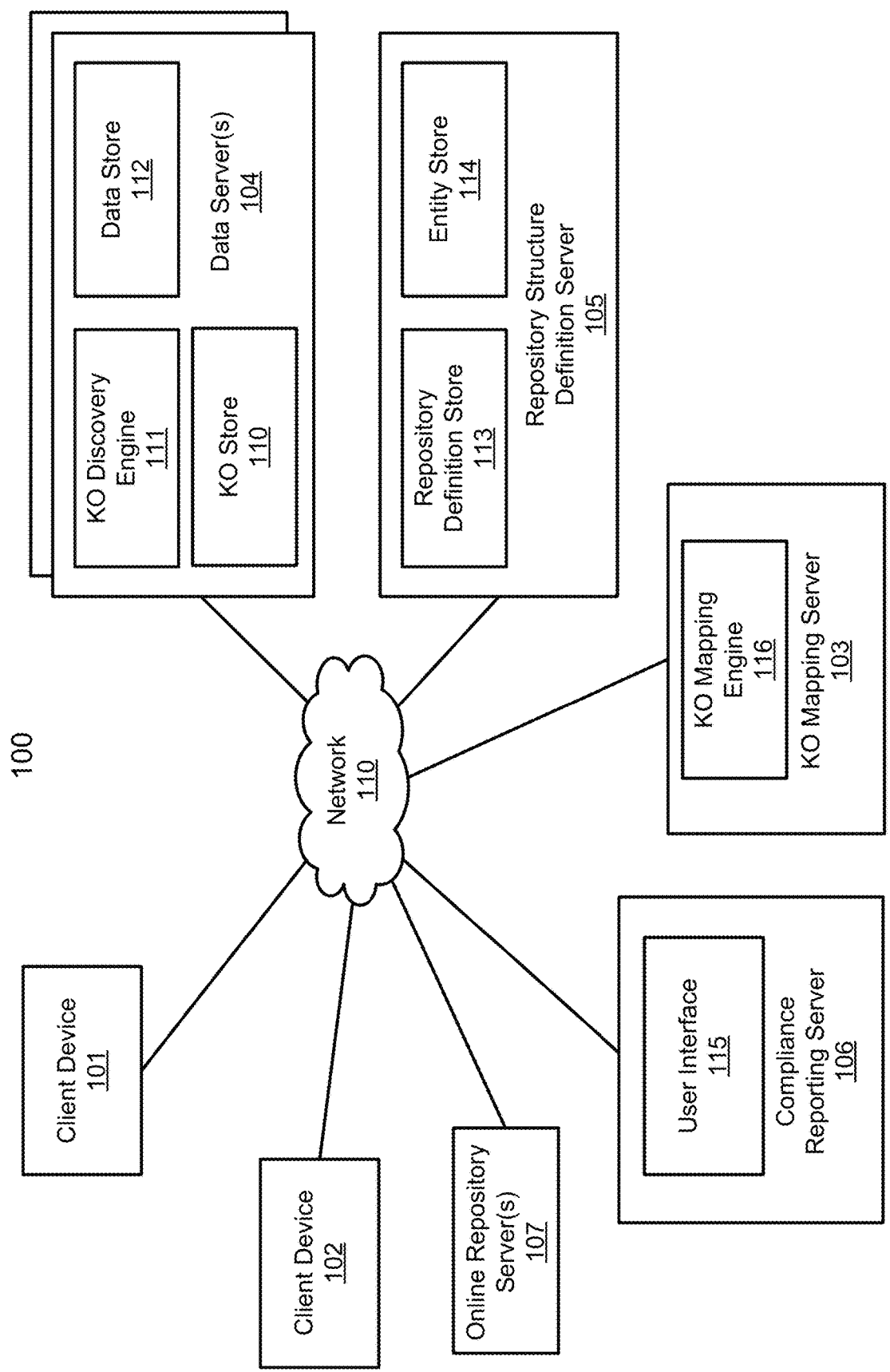
FIG. 1 is a block diagram illustrating a network system for knowledge object (KO) mapping according to one embodiment.

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a process to map knowledge objects (KOs) to data repositories has been presented. KOs can represent and categorize different types of canonical structures (or information objects) through patterns provided by the KOs. Canonical structures (or information objects) are "unique sequences" of values in structured and unstructured data (such as a repository of unstructured documents, structured data from the database tables, or data in files or file streams). These information objects can be the underlying data in a text file, a document, a PDF file, an email, an image file, a binary file, a database entry, or a field in a database. A knowledge object can contain compliance-related information (such as a pattern or a signature) for an information object without retaining a copy of the underlying data for the information object. Encapsulating the semantic information of information objects in the KOs, without the underlying data, allows the retention of KOs to be free of data security and data privacy compromises. Furthermore, the KOs and their mappings allows enterprises to analyze their systems for compliance-related issues and to comply with data subject requests (DSR/DSAR) requests as mandated by the compliance mandates such as GDPR, CCPA, HIPAA, PCI, PII, FERPA, NERC, and many such other mandates for data security compliance.

According to a first aspect, a system receives a first plurality of knowledge objects (KOs) from a KO discovery engine, each KO in the first plurality of KOs being representative of an underlying unit of structured, semi-structured, or unstructured data (canonical unit of data) stored at one or more data repositories and contains no underlying structured, semi-structured, or unstructured data, each KO being one of a number of types of KOs, where a KO is associated with a set of attributes including a type attribute specifying a type of the KO, a name attribute specifying a name for the KO, and a tag attribute specifying a classification of KOs for the KO. The system receives repository structure definition information from a repository definition store, the repository structure definition information specifying one or more repository structure definitions corresponding to the one or more data repositories. The system groups the first plurality of KOs based on the name, type, and tag attributes corresponding to the KOs, and storage paths of the underlying unit of structured, semi-structured, and unstructured data at the one or more data repositories corresponding to the KOs to generate a number of groups of KOs. For each group of the groups of KOs, the system determines a count of units of structured, semi-structured, or unstructured data corresponding to the group. The system generates a first mapping structure mapping M to N relationships between the groups of KOs to the one or more repository structure definitions based on the count for each group in the groups of KOs, the first mapping structure includes the count of the KOs for each respective group, where M and N are integer values greater than or equal to 1, wherein the first mapping structure is used for locating compliance mandated data in the one or more repositories for effective enforcement of compliance mandated actions.

Throughout this application, a data repository refers to a storage location where data is stored and organized. Data repository can include, local or remote, database repository and/or file repository. A file repository can store metadata for a set of files or the directory structure. A database repository can store metadata for the tables and/or database schemas. The metadata of a data repository can include a historical record of changes in the data repository, a set of commit objects, and a set of references to the commit objects. The main purpose of a data repository is to store data and/or files, as well as the history of changes made to those data/files. A unit of underlying data (or canonical unit of data) can refer to a smallest piece of data in a file, a file in a data repository, or an entry in a database repository that can store protected/sensitive information. Structured data refers to data that has a standardized format for efficient access by software, such as data in a database with a database schema. Unstructured data is a dataset (typical large collections of files) that are not stored in a structured database format. Examples of unstructured data can include data stored by online repositories such as Dropbox, Google Drive, etc. Semi-structured data can be data that has a combination of structure data and unstructured data, such as a spreadsheet.

As further detailed below, using KOs to store representations of data corpuses for enterprises allows the KO mapping server to capture the correlation of affinity and dependency among the units of data in the data corpuses for the enterprises.

Here, affinity refers to a similarity of characteristics suggesting a relationship or a resemblance between one or more units of data. Dependency statistics indicate whether some units of data is dependent or subordinate to other units of data, e.g., derived, computed, and/or inferred from other information objects via Formal Logic, Predicate Logic, Temporal Logic, Spatial Logic, and/or any other form of Modal Logic.

Furthermore, using KOs to store representations of the data for enterprises without a copy of the underlying data reduce the risks of data compromise. At the same time, having a mapping of the KOs to the repositories enables a compliance officer to perform compliance enforcement actions on the information of the KO-repository mapping, such as analyzing compliance-related information, updating, anonymizing, obfuscating, encrypting, and/or redacting user privacy related data, etc.

FIG. 1 is a block diagram illustrating a network system for knowledge object (KO) mapping according to one embodiment. Referring to FIG. 1, system 100 includes, but is not limited to, one or more client devices 101-102 communicatively coupled to knowledge object (KO) mapping server 103, data server(s) 104, repository structure definition server 105, compliance reporting server 106, and online repository servers 107 over network 110. Client devices 101-102 can be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 110 can be any type of networks such as a local area network (LAN), a wide area network (WAN) such as the Internet, or a combination thereof, wired or wireless.

In one embodiment, compliance reporting server 106 can be a Web server or an application server having a user interface 115, such as a Web interface, to allow a user or an administrator of client devices 101-102 to access a dashboard to add/configure a repository or view a mapping of the knowledge objects. For example, a user (e.g., an administrator of an enterprise or corporation) can access user interface 115 (e.g., Web pages) to select a particular repository to add for KO discovery. A repository can be an online repository (such as Github, Dropbox, Google drive, Box, OneDrive, or other cloud storage services, as part of online repository servers 107), or a remote database/filesystem (i.e., at a remote enterprise data center) for the user, as part of data store 112 of data server 104. In case of this, once a remote filesystem repository is selected, KO discovery engine 111 can execute a discovery algorithm to discover KOs that represent underlying files, and metadata for the files, from data store 112 of data server 104, which can represent any cloud storage servers, databases, software as a service (SaaS) systems, software as a platform (SaaP) systems, or any other data sharing platforms, etc. The scanning result can contain a plurality of KOs that match signatures of actual canonical unit data in the files stored in data store 112. The result can then be returned to mapping server 103 and can be displayed to a user via user interface 115. Note that KO discovery engine (KODE) 111 can securely access data store 112 of data center 104 for KO discovery. The KO discovery process is further detailed in FIG. 8 below.

In some embodiments, the user can select a compliance category (CC) (such as personal identifiable information (PII), payment card information (PCI), general data protection regulation (GDPR), California consumer privacy act (CCPA), health insurance portability accounting act (HIPAA), confidentiality of medical information act (CMIA), etc.). The KO discovery engine can identify the corresponding KOs that are associated to the CC for the KO discovery process. Examples of KOs for medical records can be JSON files having a pattern for a name, social security number, health insurance policy number, date of birth, addresses, or phone number. Examples of KOs for payment card information can include credit card number, type of credit card (visa, American Express, discovery, etc.), expiry date, CVV2 code, etc. These pieces of information stored at enterprises data centers are compliance-relevant data and are required to comply with the requirements of one or more data compliance categories.

Referring to FIG. 1, in one embodiment, the KO discovery engine can further store the repository structure definition on repository structure definition server 105 in an initialization process. For example, at initialization of a KO discovery at a data repository, the repository structure definition (information about the configuration of the data repository) can be stored in data store 113 and the ownership information of the repository can be stored in data store 114.

In one embodiment, the KO discovery process and/or mapping process are performed continuously, e.g., a background daemon executes periodically to capture new or updates to KOs for incremental changes at the target repositories. In one embodiment, the KO discovery process and/or mapping is performed when new data is stored at the data repository.

In some embodiments, the discovered KOs are mapped to the corresponding repository from the repository structure definition information as further detailed in FIGS. 9-14. For an overview, the KOs can be stored in data structures with the repository directory path for the KOs listed as an attribute or as part of the data structures. An aggregate of the KOs can then be mapped to the repository structure definition information based on the repository directory path attributes of the KOs. In some embodiments, the data structures have a tree/hierarchical structure and the repository directory path is inferred from the tree hierarchy. For example, in one embodiment, the directory path for the KOs and the KOs are stored as a JSON file. The JSON file can be parsed to retrieve the KOs and their respective paths. Example KOs are shown in FIGS. 9A-9D and examples of repository paths can be //dropbox/folderA, //github/, //filesystem/folderA, etc. for different repositories.

Once mapped, analysis, reporting, and enforcement can be targeted at the underlying data at any data repositories through their associated KOs. For example, if a corporate client's health records need to be redacted for compliance measures, an administrator can issue an enforcement action to the KOs associated with the users of the corporate client's health records to cause the underlying data at the repository to be redacted. In another embodiment, if an enterprise client requests review of compliance related to HIPAA, an administrator can access the KOs related to HIPAA to retrieve information about the underlying data that are stored in associated repositories for reporting purposes. Note that the KOs do not contain the underlying data. Rather, the KOs contain a signature/pattern corresponding to the underlying data.

Referring to FIG. 1, in some embodiments, servers 103-106 can be located in a main corporate data center of an organization or enterprise, or can be local or distributed data centers associated with the organization. Note that servers 103-106 can be multi-tenant data centers that provide storage services to a variety of clients. In one embodiment, servers 103-105 can be hosted by a backend server. In one embodiment, servers 103-106 can communicate with each other via a secure connection. In one embodiment, servers 103-106 can be an integrated server.

Figure 2:
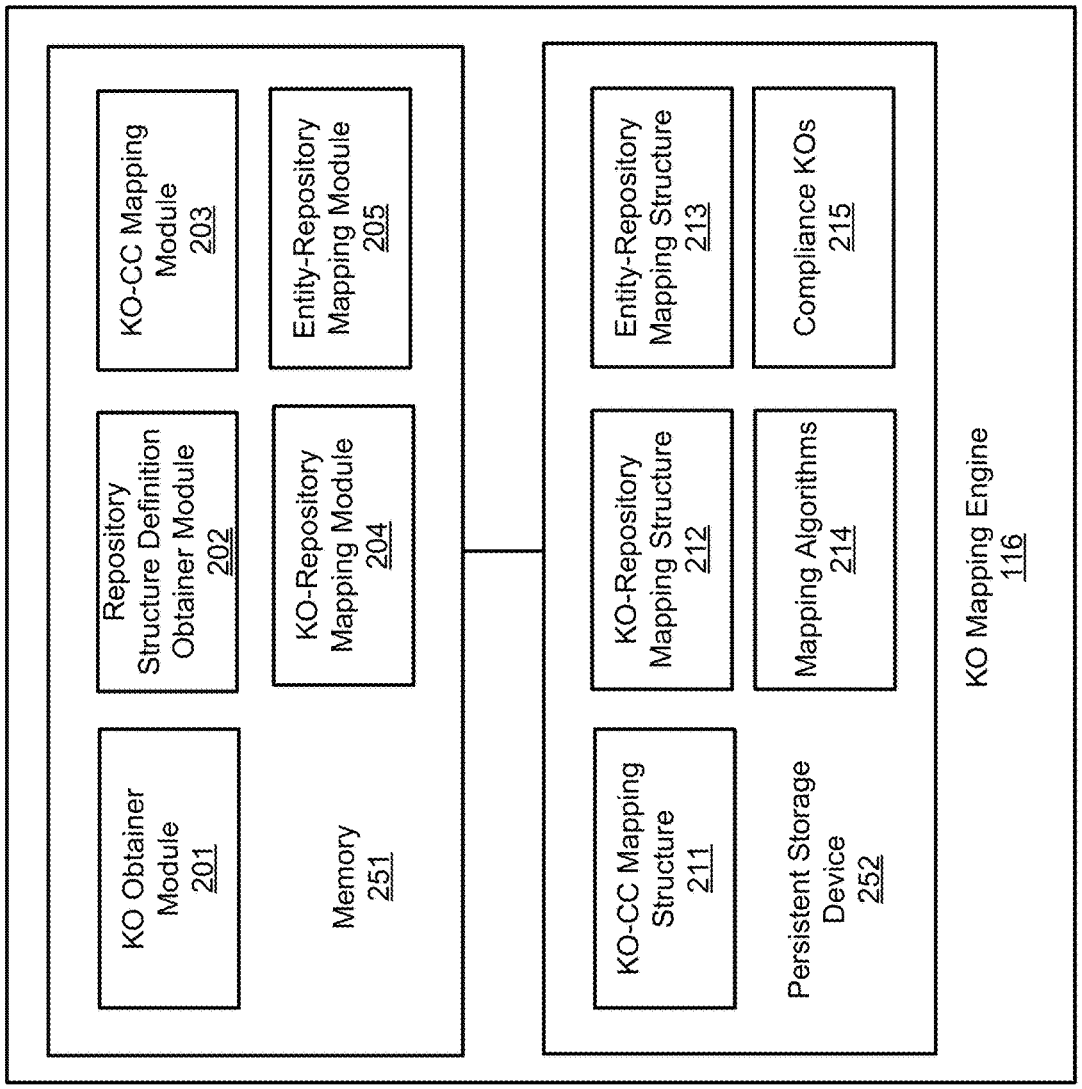
FIG. 2 is a block diagram illustrating an example of a KO mapping engine according to one embodiment.

FIG. 2 is a block diagram illustrating an example of a KO mapping engine 116 according to one embodiment. KO mapping engine 116 can map KOs to their respective repository structure definition information, compliance categories, and/or ownership entities.

Referring to FIG. 2, KO mapping engine 116 can include KO obtainer module 201, repository structure definition obtainer module 202, KO-CC mapping module 203, KO-repository mapping module 204, and entity-repository mapping module 205. Some or all of modules 201-205 can be implemented in software, hardware, or a combination thereof. For example, these modules can be installed in persistent storage device 252, loaded into memory 251, and executed by one or more processors of server 103. Note that some or all of these modules can be communicatively coupled to or integrated with some or all modules of servers 104-106. Some of modules 201-205 can be integrated together as an integrated module.

KO obtainer module 201 can obtain a plurality of KOs from KO discovery engine (KODE) 111. The KOs can be discovered from data store 112 of data server(s) 104 or online repository server(s) 107. Repository structure definition obtainer module 202 can obtain repository structure definition information for one or more repositories. For example, an administrator can specify the repositories for KO discovery. Thereafter, configuration information of the repositories can be captured and stored at repository definition store 113 of repository structure definition server 105. Repository structure definition obtainer module 202 can obtain the repository structure definition information from repository definition store 113. In another embodiment, repository structure definition obtainer module 202 can obtain user information for the repositories from entity store 114. The user information can be used to determine which entity has ownership of which repository.

KO-CC mapping module 203 can generate a map for the KO with respect to compliance categories. The generated map can be stored as part of KO-CC mapping structure 211. KO-repository mapping module 204 can generate a map for the KO with respect to files, folders, subdirectories, directories, tables, databases and data stores of the one or more repositories. The generated map can be stored as part of KO-repository mapping structure 212. Entity-repository mapping module 205 can generate a map for the entity with respect to the files, folders, subdirectories, directories, tables, databases and data stores of the one or more repositories. The generated map can be stored as part of entity-repository mapping structure 213.

Using the maps or mapping information, a user can request a view to be generated to analyze compliance mandates with respect to the KOs, compliance categories, and/or entities. For example, a user can generate a view for a particular KO (e.g., first name) which would show compliance categories and/or ownership entities of repositories that have mappings to the KO. In some embodiment, a user can request the underlying data corresponding to the KO to be anonymized, obfuscated, encrypted and/or redacted to comply with a particular data privacy mandate. In some embodiments, the underlying data of KOs can be anonymized, obfuscated, encrypted and/or redacted to prevent inference attacks. Here, an inference attack occurs when a nefarious user is able to infer, from trivial information, other information about a database/filesystem which may be data security and/or privacy compliance mandated without directly accessing it.

FIG. 3 is a block diagram illustrating an example of an entity data structure according to one embodiment. Referring to FIG. 3, entity data structure 300 can represent any users, group of users, and/or accounts. These users, group of users, and/or accounts can own one or more repositories, root directories or subdirectories of the one or more repositories. In one embodiment, entity data structure 300 can include entity identifier 301, entity name 302, entity title 303, and entity department 304. Entity identifier 301 can uniquely identify a user, user group, or account. Entity name 302 can specify a name of the entity, which can be displayed to a user via a user interface. Entity title 303 can specify a title of the entity, such as a role of a user in the enterprise. Entity department 304 can specify a work department for the entity. A plurality of entities in the form of entity data structures can be stored in entity store 114 as part of repository structure definition server 105.

FIG. 4 is a block diagram illustrating an example of a repository structure definition according to one embodiment. Referring to FIG. 4, repository structure definition 400 can represent any of the repository structure definition tables 311. In one embodiment, repository structure definition table 400 can include identifier 401, repository class 402, repository type 403, storage location 404, name 405, branch 406, transport 407, authentication information 408, date created 409, date updated 410, and progress status 411 attributes. ID 401 uniquely identifies a repository structure definition or setting associated with a particular knowledge object discovery (KOD) task. Repository class can specify the transciency of the data contained and/or streamed through it such as (1) stationary data repository e.g. database, knowledgebase, document corpus, online storage, etc. (2) real-time streaming data source such as video, audio, text streams, etc. Repository type can specify the modality of the data items such as binary data, textual data, digital format, analog format etc.

Repository or storage location 404 can specify a directory or path of a particular storage location in which an KOD task will be performed. Alternatively, repository location 404 can specify a network address such as a universal resource locator (URL) pointing to the storage location. Name 405 can specify a name of the storage location, which can be displayed to a user via a user interface. Transport 407 can specify certain communications or storage access protocols that are required to access the storage location, such as network file systems, etc. Date created 409 can store the date of which the repository structure definition was created and date updated 410 can store the last update date. Progress 411 can indicate the status of the corresponding KOD task such as a percentage of completion, etc.

Note an KODE task is shown to be performed on a unit of data, such as a snippet of text or a file stored in a storage device for the purpose of illustration. However, the techniques described herein can also be applicable to other data sources, such as, for example, a database of unstructured documents, structured data from the database tables, or any other electronic data such as images, digital signals, or real-time data streams.

In one embodiment, a compliance officer or user or a system can automatically access data in a storage location via the storage location specified in field 404. When the user or system accesses the storage location, the user access utilizes the authentication information stored in field 408. The authentication information can include a username and a password, as well as the authentication type. In one embodiment, repository structure definition table 400 can be created based on user configuration information received from a client device. Repository structure definition information in the form of repository structure definitions can be stored in repository definition store 113 as part of repository structure definition server 105.

FIG. 5 is a block diagram illustrating an example of a data structure representing a knowledge object according to one embodiment. KO 500 can represent any of the KOs of FIG. 1. Referring to FIG. 5, in one embodiment, KO 500 can include type 501 name 502, value 503, verify 504, structure 506, tag 507, enabled flag 508, last modified date 509, and storage location 510 attributes. Type attribute 501 can identify one of the multiple types of KOs (e.g., basic—$\alpha$, advance—$\beta$, complex—$\epsilon$, noise—$v$). Name attribute 502 can specify a name of the corresponding KO. There can be multiple KOs with the same type, but with a different name.

In one embodiment, value attribute 503 can store a value or data pattern used to match a field extracted from a file. Value attribute 503 can store certain leading characters, numbers, or a combination of both. In another embodiment, value attribute 503 can store a finite state automaton (FSA), a regular expression, or a custom script that can be executed by bash/shell or other script executors. When the field is executed, the execution results indicate whether the field matches certain attributes of the corresponding KO. Dependent upon the specific type of a KO, verify attribute 504 can store a method or an algorithm to further verify that a particular field has a certain pattern that matches the pattern depicted by the KO.

In one embodiment, the size of attribute 505 stores an expected size of at least a portion of a field to be matched. This is another attribute that can be utilized to match a field, just another level of a confirmation process. In one embodiment, value attribute 503 can include only the leading characters and the size of attribute 505 can specify the length of the subsequent characters, numbers, or a combination thereof.

In one embodiment, structure attribute 506 stores a value indicating a format or structure associated with the corresponding KO. For example, structure attribute 506 can indicate whether the KO is associated with an Alphabetic string, a Numeric string value, or an Alphanumeric string value. Tag attribute 507 can store a tag value indicating that the KO is associated with a particular class of KO (e.g., customer keyword, national ID, industry). Enabled attribute 508 can store an enabled flag indicating that an Knowledge Object Discovery Policy (KOD Policy) associated with the KO has been enabled. When enable attribute 508 is enabled, the system can perform an enforcement action according to a preconfigured enforcement policy, which can be specified in a policy table. Last modified date attribute 509 can specify a time/date when the underlying data associated to the KO was last edited. Storage location 510 can specify a storage location of the underlying data associated to the KO. KOs in the form of KO data structures can be stored in KO store 110 as part of data server(s) 104. The KO data structures can be stored in a tree-like hierarchy manner or stored as a hash table to quickly access the KO data structures. In one embodiment, the KOs or KO data structures are stored as JSON objects in a JSON file. In one embodiment, the KOs or KO data structures are stored in a hierarchical tree structure (e.g., similar to a file system) and the storage location attribute of the KOs are used to specify a location in the tree structure for the KOs.

FIG. 6 shows example types of knowledge objects according to some embodiments. Referring to FIG. 6, KOs 601-604 can represent four different types of KOs, however, other types of KOs can be derived from a combination from the four different types. These KOs can be homogenous structures having the same number of attributes. However, dependent upon the type of KO, the values in the attributes and/or verification process can be different. KO 601 can refer to a basic type of KO (also referred to as an $\alpha$-knowledge object or $\alpha$-object) and it is a declarative KO. KO 602 is referred to as an advanced KO (also referred to as a $\beta$-knowledge object or $\beta$-object) and it is a regular expression-type of KO that encodes the Finite State Automata (FSA) of the KO. KO 603 can refer to a complex KO (also referred to as an $\epsilon$-knowledge object or $\epsilon$-object), which can be a combination of one or more KOs 601 and/or 602. KO 604 can be utilized for noise reduction, e.g., filtering (also referred to as a v-knowledge object or v-object) and KO 604 can contain a list of lexeme types that are regarded as noise in the data repository. In some embodiments, the KOs can include a subset of the attributes or all of the attributes that are shown in FIG. 5. Having a homogeneous structure is an important characteristic of all the 4 types of the KOs that provides a crucial uniformity in Knowledge Encoding in the KOs. This crucial characteristic also allows the Knowledge Object Discovery engine to perform the same algorithm when discovering KOs. This also enables the required Inference to be performed by the Knowledge Object Discovery engine.

FIG. 7A shows an example of KO 601. Specifically, in this example, the KO is a declarative KO to match a social security number (SSN). The value attribute specifies the leading characters "SSN" and the verify attribute specifies that the matching is for lexical matching, which is static matching. The tag attribute can further define a specific class of information object or a specific format that is expected when matching the value attribute. For example, in this example, since the value attribute is an SSN, the tag attribute can further define that the format of the SSN is compliant to a specific country or jurisdiction, since each country can have a different SSN format. This type of KOs does not require an executable algorithm to be executed for further verification.

FIG. 7B shows an example of KO 602. Specifically, in this example, the value attribute specifies a finite state automaton (FSA) that can be executed to identify underlying data for matching purposes. In this case, the FSA corresponds to a regular expression or signature pattern that identify the content to be numeric values 0-9 matching the preceding characters "10" times. The structure attribute indicates that the data stored in the value attribute is a numeric value. In other embodiments, the values for the structure attribute can be alphanumeric or alpha. The size or length of the value attribute is specified in the size of attribute. The verify attribute specifies a verification algorithm that is executed to further verify the matching of a field of the corresponding KO.

FIG. 7C shows an example of KO 603, which is an ε KO. In one embodiment, the value attribute contains multiple values and a logical relationship between the values that need to be satisfied in order to match a particular field. In this example, the value attribute includes a first KO "SSN" and a second KO "IB SN (NEAR) (20)." The relationship between the first KO and the second KO is a logical AND. Thus, in order to match a particular field with an ε KO as shown in FIG. 7C, the first KO "SSN" (e.g., KO 601) and the second KO "IBSN (NEAR) (20)" (e.g., KO 602) have to be satisfied. The logical relationship can also be a logical OR or logical XOR relationship. In some embodiments, the logical relationships can specify the ordering of the combination of KOs, proximity, look backward, or look forward values for matching. That is, the ε KO in FIG. 7C can capture logical relationships (e.g., proximity) information between two or more KOs. With the combination of α, β, and ε types of KOs, the KOs not only can be used to detect patterns in underlying data but can also be used to detect logical relationships between the patterns in two or more units of underlying data.

The attributes of any of the KOs can be sequentially verified against structured data and unstructured underlying data in a data repository to determine if content of the underlying data being examined matches a pattern given by the corresponding KO. For example, the attributes of a KO can be used to identify whether an entry in a database has content that would match a pattern provided by the KO. In another example, the attribute can be used to identify whether text in a document file or text in a text-edible image contains content that would match a pattern provided by the KO. When a match is found, the matching KO can be used as a representation for the underlying data. That is, the KO can be used for compliance reporting to indicate such underlying data is found with a pattern that matches the KO at a particular repository without revealing the underlying data to comply with a privacy mandate.

Figure 8:
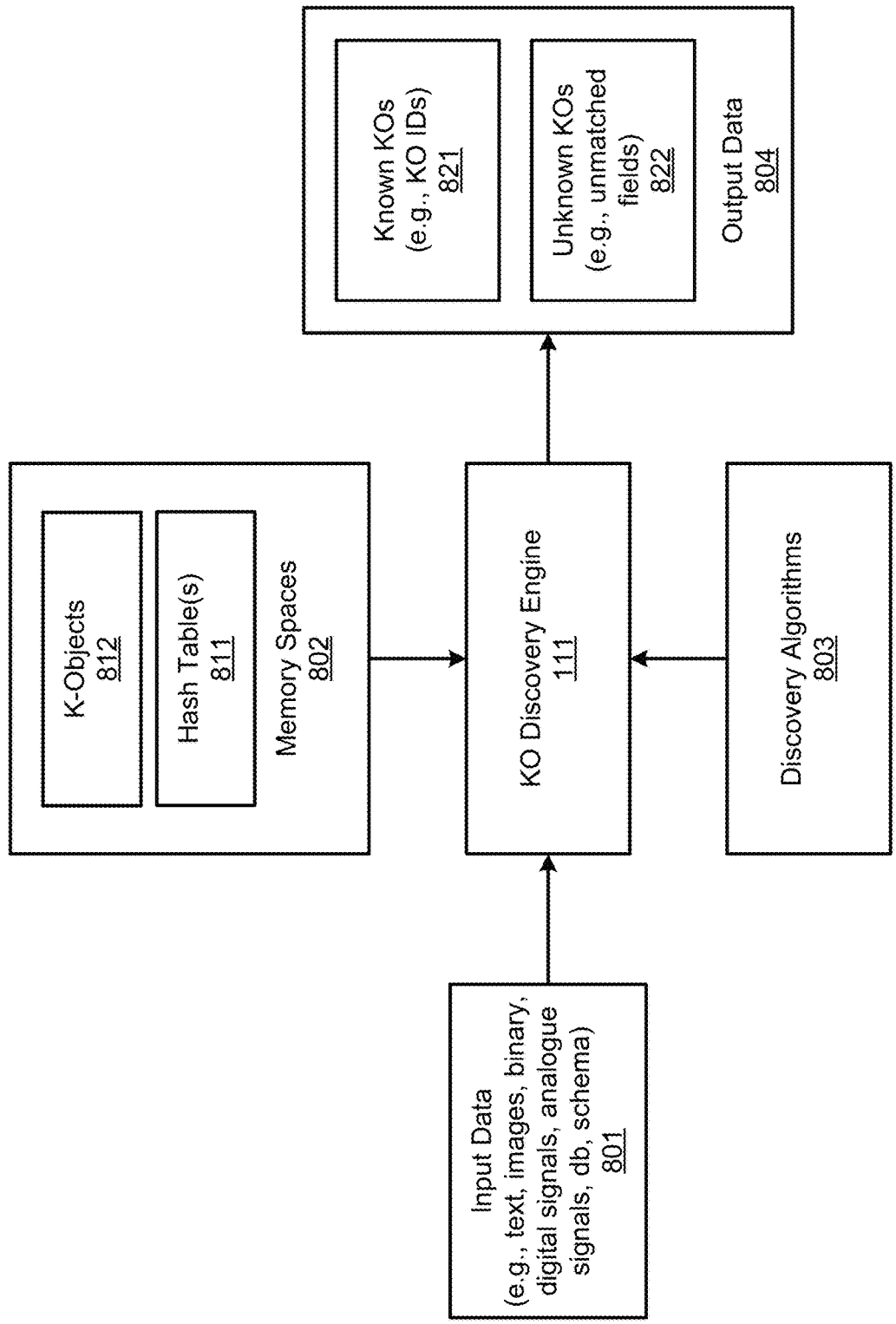
FIG. 8 is a block diagram illustrating a processing flow of a knowledge object discovery engine according to one embodiment.

FIG. 8 is a block diagram illustrating a processing flow of an object discovery process according to one embodiment. Referring to FIG. 8, in response to a set of input data 801, KODE 300 determines a set of fields from the input data based on an analysis of the input data 801. For each of the fields extracted from input data 801, KODE 300 applies an object hash table 811 to the field. Hash table 811 has been created for each set of KOs of different types 812. The hash table 811 and the KOs 812 have been populated in the memory spaces 802 of the system, such as main memory (e.g., random access memory or RAM, a processor memory within a process, a cache memory, etc.).

In one embodiment, each type of KOs can be populated into a specific memory space and a hash table is created to represent the KOs of that particular type. Thus, for the four types of KOs as shown in FIG. 6, there are at least four memory spaces are created and at least four hash tables can be created.

In one embodiment, hash table 811 returns one or more pointers pointing to one or more of KOs 812. For each of the KOs returned from hash table 811, KODE 300 performs the matching operations against each field extracted from input data 801, including matching or executing an FSA specified in the value attribute and executing a verification function specified in the verify attribute of the KO using one or more verification algorithms 803. If it is determined that the field matches a particular KO, the KO or its object ID can be inserted into result or output 804 as part of KOs 821. If there is no match, the field can be inserted into the result 804 as part of unknown objects 822.

Figure 9:
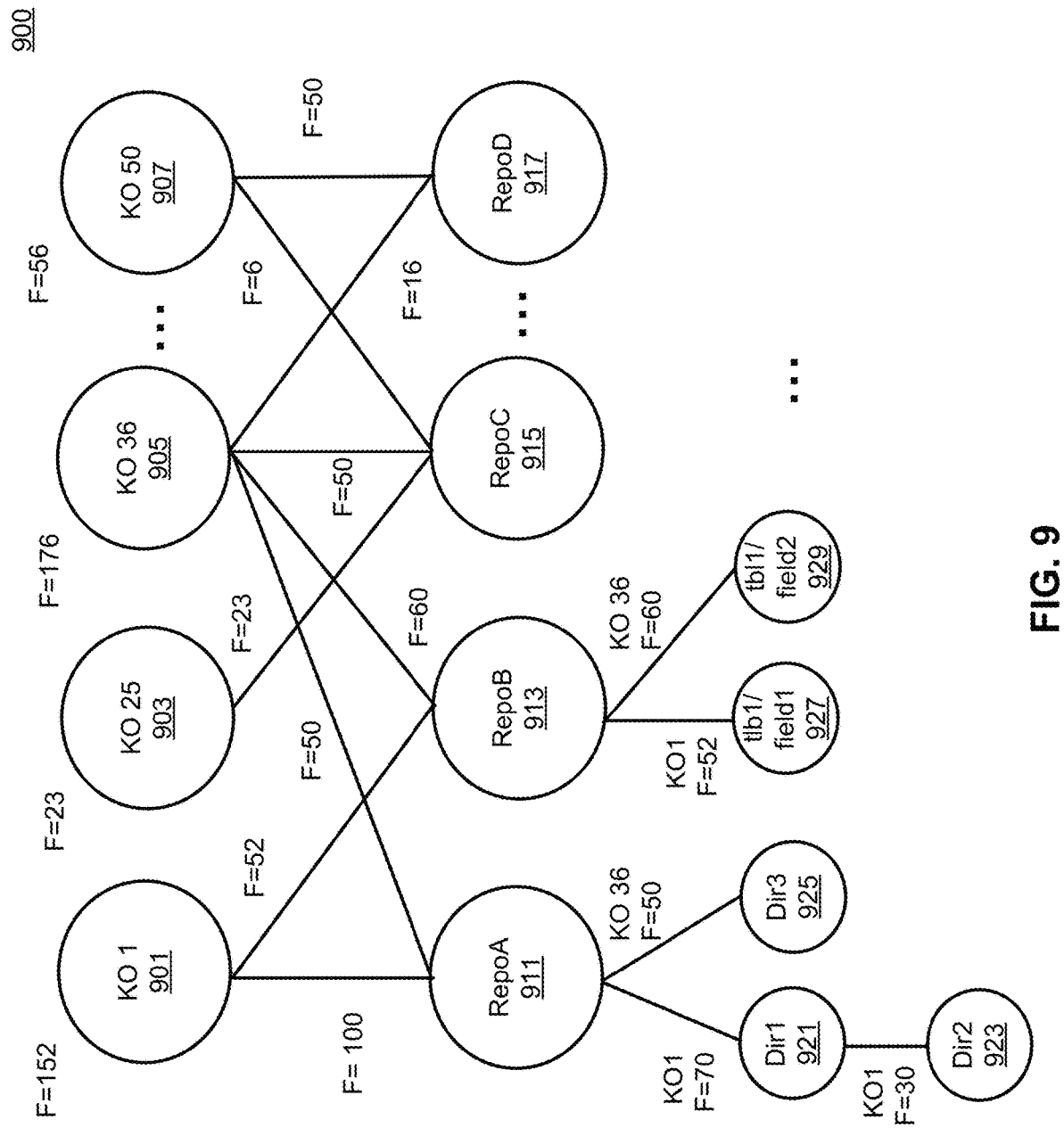
FIG. 9 is a block diagram illustrating an example of KO-repository mappings according to one embodiment.

FIG. 9 is a block diagram illustrating an example of KO-repository mappings 900 according to one embodiment. KO-repository mappings 900 can specify which repository has which KOs and can specify a number of KOs in the respective repository or subdirectory of the repository. Referring to FIG. 9, KO groups 901-907 can specify different groupings of KOs. For example, KO group 901 can be a grouping of knowledge objects with a pattern for "data of birth" for a particular country, etc. (e.g., grouped under the same name, type, and tag attributes). KO 903 can be a grouping of knowledge objects with a pattern for social security number, etc. A plurality of KOs can be retrieved from KO store 110 of FIG. 1 to derive KO groups 901-907.

Repo 911-917 can include different data repositories (repos), such as, dropbox 911, mySQL 913, google drive 915, office 365 email 917, etc. The configuration information for the repositories can be retrieved from repository definition store 113. The configuration information for the repositories provide at least information for the type, name, and class of the repositories, and the users who can maintain the repositories.

In one embodiment, processing logic can execute a mapping algorithm to map the KOs to the repositories. The algorithm can be executed periodically (hourly, daily, weekly, etc.) by a daemon process as a background job. In some embodiments, the algorithm can be executed when new KOs are detected at store 110 of FIG. 1, e.g., new KOs are discovered.

In one embodiment, a mapping algorithm (as part of mapping algorithms 214 of FIG. 2) can retrieve the discovered KOs from store 110 and available repo configuration information from store 113. In one embodiment, processing logic can traverse the KOs and map the KOs to the repos that contain the underlying data represented by the KOs. Once the KOs are mapped to the repositories, the KOs can be further grouped by some combinations of its attributes. For example, the KOs can be grouped by type, name, and tag attributes, and/or the repository storage locations of the underlying data to obtain KO groups 901-907. Similarly, data repositories can be grouped by class, type, name attributes, and/or any other attributes to obtain repos 911-917. This way, the available mappings are reduced into a manageable set of mappings that can be retrieved for compliance viewing, reporting, and/or enforcement purposes.

In one embodiment, the mapping can be performed by matching the repository location attribute from the repository data structures corresponding to the data repositories to the storage location attribute corresponding to the KO data structures of the KOs. Matching locations of a repo and storage location for a KO can indicate the KO has underlying structured and/or unstructured data stored at the data repository location. When there are more than one KOs stored in a repo, a count can be used to indicate the number of KOs stored in the repo and the KOs can be aggregated for ease of reporting. In one embodiment, the KO-repository mapping can be represented by a three tuple: (D, R, f), where D denotes the KOs grouped by {tag, type, and name} attributes; R denotes the repos grouped by {class, type, and name} attributes, and f denotes a count of KOs that represent the number of units of underlying data mapped to R. In an example, KO 903 can be grouped as D={NationalID, Lexeme, and SSN}, Repo 913 can be grouped as R={Google Drive, onlineRepo, myDrive}, and f=23. In some embodiments, if the repository is a database, the repo can be grouped as R={class, type, name, and field}, where field denotes the column/field name of a table in the database.

In some embodiment, to keep track of the total number of KOs in any repositories or combinations thereof, an aggregate count of KOs in the repository or combinations thereof can be calculated by summing the counts in the respective sub-groups of KOs. In some embodiments, the KOs can be tracked over a predetermined time period to determine changes in the aggregated count for the KOs over the predetermined time period.

Referring to FIG. 9, once mapped, KO group 901 can be retrieved for compliance reporting/analysis purposes. As depicted in FIG. 9, f=152 for KO group 901 denotes 152 units of underlying data and found in RepoA and RepoB. Here, 152 can be determined by summing the 100 at RepoA and 52 at RepoB. E.g., 100 can be found in RepoA and 52 can be found in RepoB. Drilling down to the subdirectories 921-929, 70 units of underlying data corresponding to KO group 901 can be found in RepoA/Dir1, 30 units of underlying data corresponding to KO group 901 can be found in RepoA/Dir2, etc. Here, the 100 at RepoA can be determined by summing the 30 units at RepoA/Dir2 and 70 units at RepoA/Dir1. In one embodiment, the counts can be aggregated for reporting purposes if a user only wants to view an aggregate of the KOs for some combinations of repositories.

Figure 10:
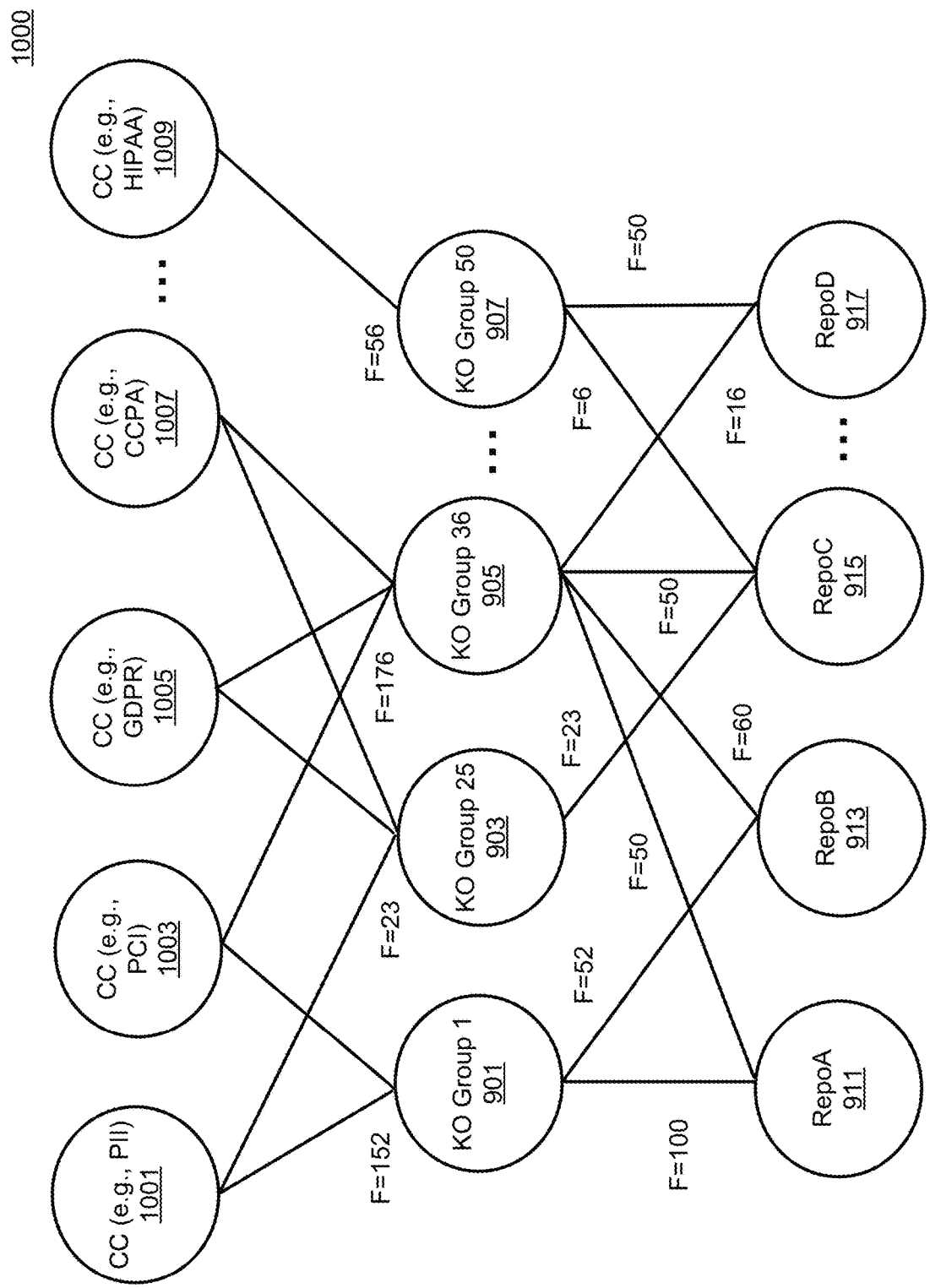
FIG. 10 is a block diagram illustrating an example of KO-repository and KO-compliance category mappings according to one embodiment.

FIG. 10 is a block diagram illustrating an example of KO-repository and KO-compliance category mappings 1000 according to one embodiment. Mappings 1000 can include the KO-repository mappings 900 of FIG. 9 and the KOs are mapping to compliance categories specified by a user. For example, compliance categories (CC) can be PII 1001, PCI 1003, GDPR 1005, CCPA 1007, HIPAA 1009, etc. The compliance categories can be regulated by government entities or private regulatory bodies, where each compliance category specifies a set of requirements. These requirements can correspond to a particular set of KOs. For example, a first set of KOs can correspond to PII 1001, a second set of KOs can correspond to PCI 1003, etc. Some KOs correspond to multiple compliance categories.

In one embodiment, mapping algorithms 214 can be executed by processing logic to map KO groupings 901-907 to compliance categories 1001-1009. For example, for each compliance category, processing logic derives the set of KOs that corresponds to the compliance category. The set of KOs (as part of compliance KOs 215 of FIG. 2) can be derived from government website and/or configured by an administrator of server 103 for mapping purposes.

Next, processing logic can iterate through the set of KOs for the compliance category. For each KO in the set, processing logic determines if the KO has attributes (e.g., name, type, and/or tag, etc.) that match any of the KO groups 901-907. If yes, the compliance category is mapped to the respective KO group (denoted by a connection line). In one embodiment, processing logic can repeat the mapping process for each compliance category. Here, the CC can be mapping to a particular repository using the CC-KO and the KO-repository mappings.

Figure 11:
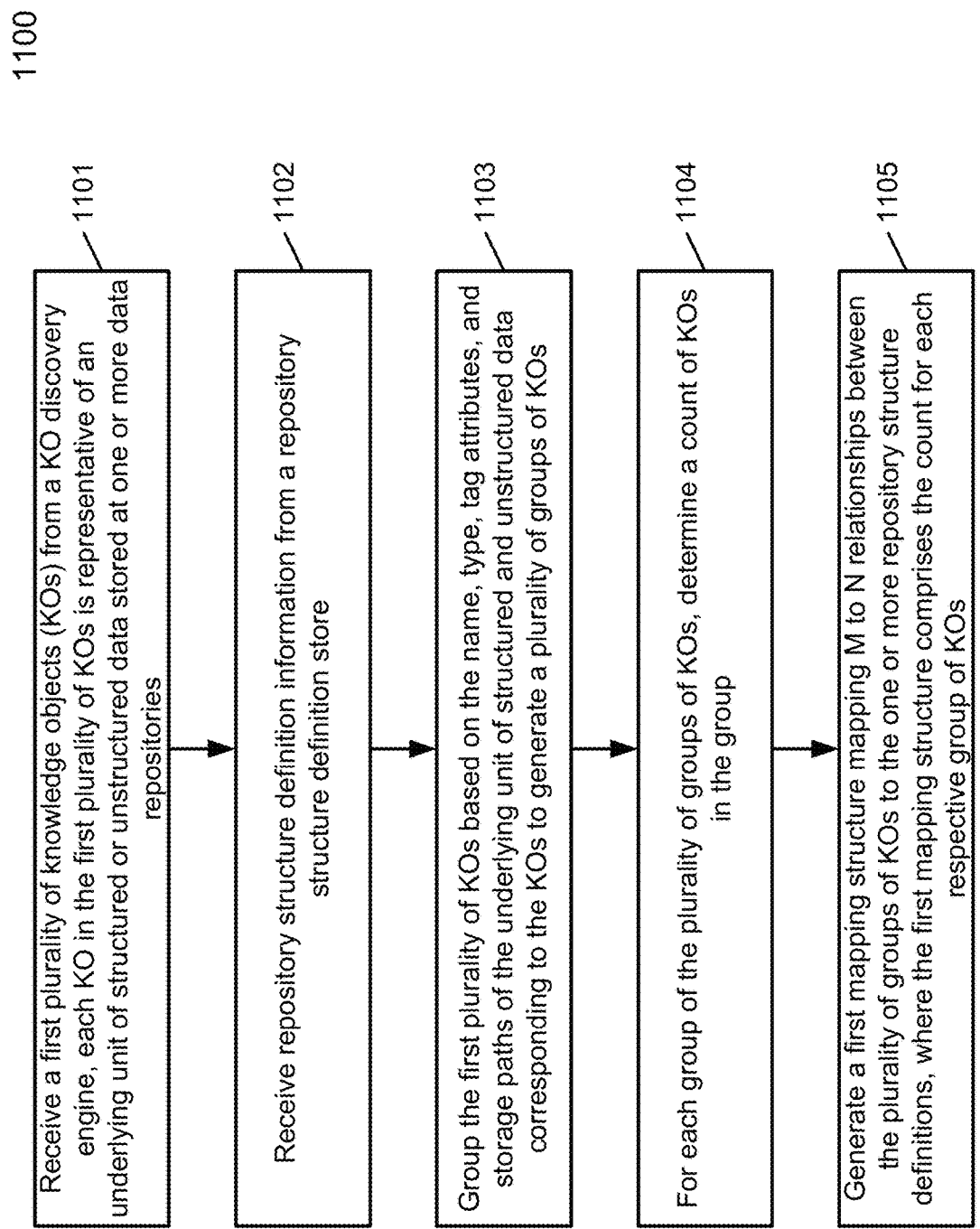
FIG. 11 is a flow diagram illustrating an example of a process to map KOs to repositories according to one embodiment.

FIG. 11 is a flow diagram illustrating an example of a process to map KOs to repositories according to one embodiment. Process 1100 can be performed by KO mapping engine 116 of FIG. 2, which can be performed by processing logic implemented in software, hardware, or a combination thereof. Specifically, process 1100 can be performed to map KOs to repos as shown by the connection lines in FIG. 9.

Referring to FIG. 11, at block 1101, processing logic receives a first plurality of knowledge objects (KOs) from a KO discovery engine, each KO in the first plurality of KOs being representative of an underlying unit of structured or unstructured data stored at one or more data repositories and containing no underlying structured or unstructured data. Each KO being one of a plurality of types of KOs, where a KO is associated with a set of attributes including a type attribute specifying a type of the KO, a name attribute specifying a name for the KO, and a tag attribute specifying a class of KOs for the KO.

For example, processing logic can receive a number of KOs from KO store 110 of FIG. 1. The received data can be in JSON format and the KOs can be JSON objects nested in a hierarchy/directory structure, where the hierarchy/directory structure represent the storage location of the underlying data associated to the KOs.

At block 1102, processing logic receives repository structure definition information from a repository definition store, the repository structure definition information specifying one or more repository structure definitions corresponding to the one or more data repositories. Processing logic can receive repository structure definition information from repository definition store 113. The repository structure definition information can include some or all of attributes 401-411 of FIG. 4.

At block 1103, processing logic groups the first plurality of KOs based on the name, type, tag attributes, and storage paths of the underlying unit of structured and unstructured data corresponding to the KOs to generate a plurality of groups of KOs.

At block 1104, for each group of the plurality of groups of KOs, processing logic determines a count (denoted by F in FIG. 9) of KOs in the group.

At block 1105, processing logic generates a first mapping structure mapping M to N relationships between the plurality of groups of KOs to the one or more repository structure definitions, where the first mapping structure comprises the count for each respective group of KOs, where M and N are integer values greater than or equal to 1.

For example, each KO can have a mapping tree structure with connection lines extending outward from the KO, as shown in FIG. 9. The connection lines can be denoted with a count for the number of KOs at that junction. Here, each connection line denotes that there exist a mapping relationship between two elements connected by the connection line.

Figure 12:
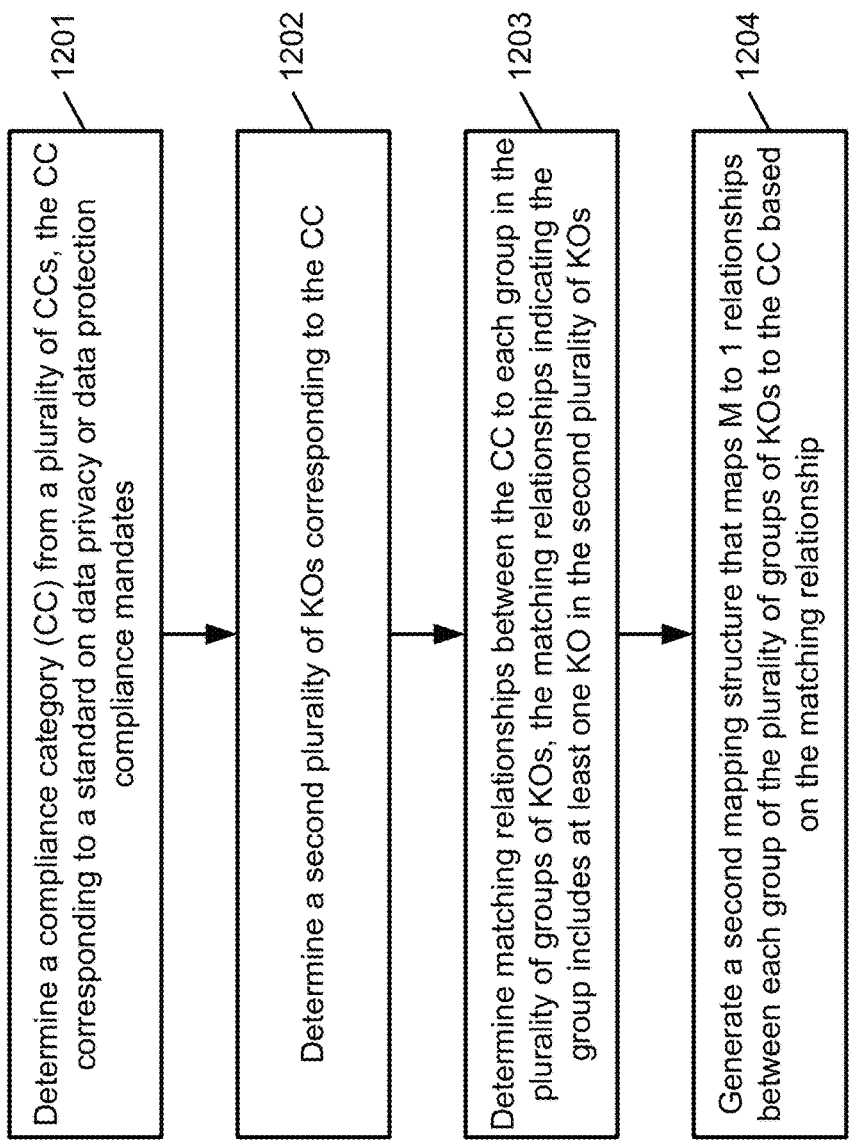
FIG. 12 is a flow diagram illustrating an example of a process to map KOs to compliance categories according to one embodiment.

FIG. 12 is a flow diagram illustrating an example of a process to map KOs to compliance categories according to one embodiment. Process 1200 can be performed by KO mapping engine 116 of FIG. 2, which can be performed by processing logic implemented in software, hardware, or a combination thereof. Specifically, process 1200 can be performed to map KOs to compliance categories (CC) as shown by the connection lines between the CCs and the KOs in FIG. 10.

Referring to FIG. 12, at block 1201, processing logic determines a compliance category (CC) from a plurality of CCs, the CC corresponding to a standard on data privacy or data protection compliance mandates. The processing logic can call a predetermined function based on the field to determine whether the field type is Alphabetic, Numeric, or Alphanumeric, as well as the size or length of the field.

At block 1202, processing logic determines a second plurality of KOs corresponding to the CC, the second plurality of KOs being a subset of the first plurality of KOs.

At block 1203, processing logic determines matching relationships between the CC to each group in the plurality of groups of KOs, the matching relationships indicating the group includes at least one KO in the second plurality of KOs.

At block 1204, processing logic generates a second mapping structure that maps M to 1 relationships between each group of the plurality of groups of KOs to the CC based on the matching relationship.

For example, each CC can have a mapping tree structure with connection lines extending outward from the CC to their associated KO(s), as shown in FIG. 10. The total count of KOs associated to the CC can be a sum of the counts of the KOs that the CC is associated with. Here, a connection line denotes that there exists a mapping relationship between the two elements.

Figure 13:
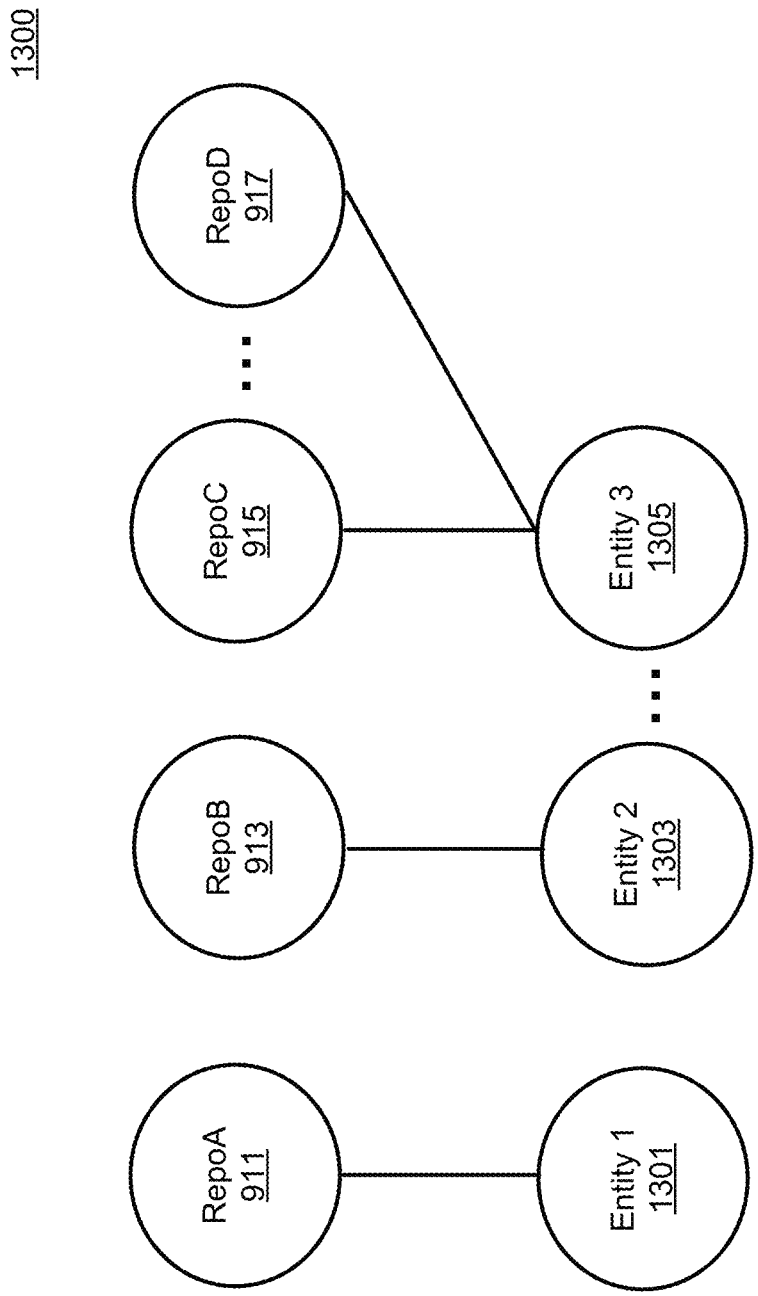
FIG. 13 is a block diagram illustrating an example of entity-repository mappings according to one embodiment.

FIG. 13 is a block diagram illustrating an example of entity-repository mappings 1300 according to one embodiment. Mappings 1300 can further specify the mapping relationships between repositories 911-917 and entitie(s) 1301-1305. The mapping indicate which entitie(s) are the owners of which repositories. Here, some repositories can have multiple owners and some owners can own multiple repositories.

In one embodiment, to generate the mapping relationships (connection lines) in FIG. 13, mapping algorithms 214 can be executed by processing logic to retrieve repositories 911-917 from repository definition store 113 and retrieve entities 1301-1305 from entity store 114 of FIG. 1. Processing logic can then map the retrieved repositories 911-917 to the retrieved entities 1301-1305 using the authentication credential attribute of the repositories. For example, for each entity in the retrieved entities, processing logic scans the repository structure definition of the repositories 911-917 and determine if the entity has credentials associated to the authentication credential attribute of the repository. If an association is found, the entity can be said to have maintenance rights to the repository.

Next, processing logic generates a mapping structure that depicts the associations between one or more entities and one or more repositories. In one embodiment, the entity-repository mapping can be represented by a three tuple: (E, R, f), where E denotes the entity by {name, title, and department} attributes; R denotes the repos grouped by {class, type, and name} attributes, and f denotes a count that represent the number of repositories maintained by the entity. Here, the entity-repository mapping can provide compliance information regarding which persons have ownership rights to respective repositories. In some embodiments, any elements can be mapped to another element by using the entity-repository, KO-repository, and CC-KO mappings. For example, entities can be mapped to KOs and entities can be mapped to CCs using the entity-repository, KO-repository, and CC-KO mappings.

In some embodiments, processing logic uses the mapping relationships to locate the underlying data corresponding to a particular KO, CC, repository, and/or entities through the CC-KO, KO-repository, and entity-repository mappings. Processing logic can then perform mitigation actions according to a data compliance mandate, including redacting, anonymizing, obfuscating and/or encrypting the underlying data corresponding to the KOs.

For example, a compliance officer can specify KOs related to a CC in a particular repository to be redacted, where redacting refers to substituting the text with a generic character to conceal the text in underlying files/database entries that correspond to the KOs. In this case, processing logic can locate the KOs in the repository for a particular CC using the CC-KO and KO-repository mappings. The KOs that intersect the two mappings matching the CC and repository can then be identified for redacting.

Anonymization is the process of protecting private or sensitive data by data masking, pseudonymization, generalization, data perturbation, injecting synthetic data into the data that are connected to the KO. Pseudonymization replaces private identifiers with fake identifiers or pseudonyms. Generalization removes some of the data to make it less identifiable. Data can be modified into a set of ranges. Data swapping shuffles, rearranges, and/or permutes the data values so they do not correspond with the original data values. Other techniques such as k-anonymization can be used to protect the data.

Data obfuscation is the process of obscuring confidential or sensitive data to protect it from unauthorized access. Data obfuscation tactics can include masking, tokenization, data swapping, and data reduction.

Encryption can encode data into an alternative form, e.g., ciphertext, to obscure the data. Encryption can use asymmetric (public-private) key schemes or symmetric (same key for encryption and decryption) key schemes.

Figure 14:
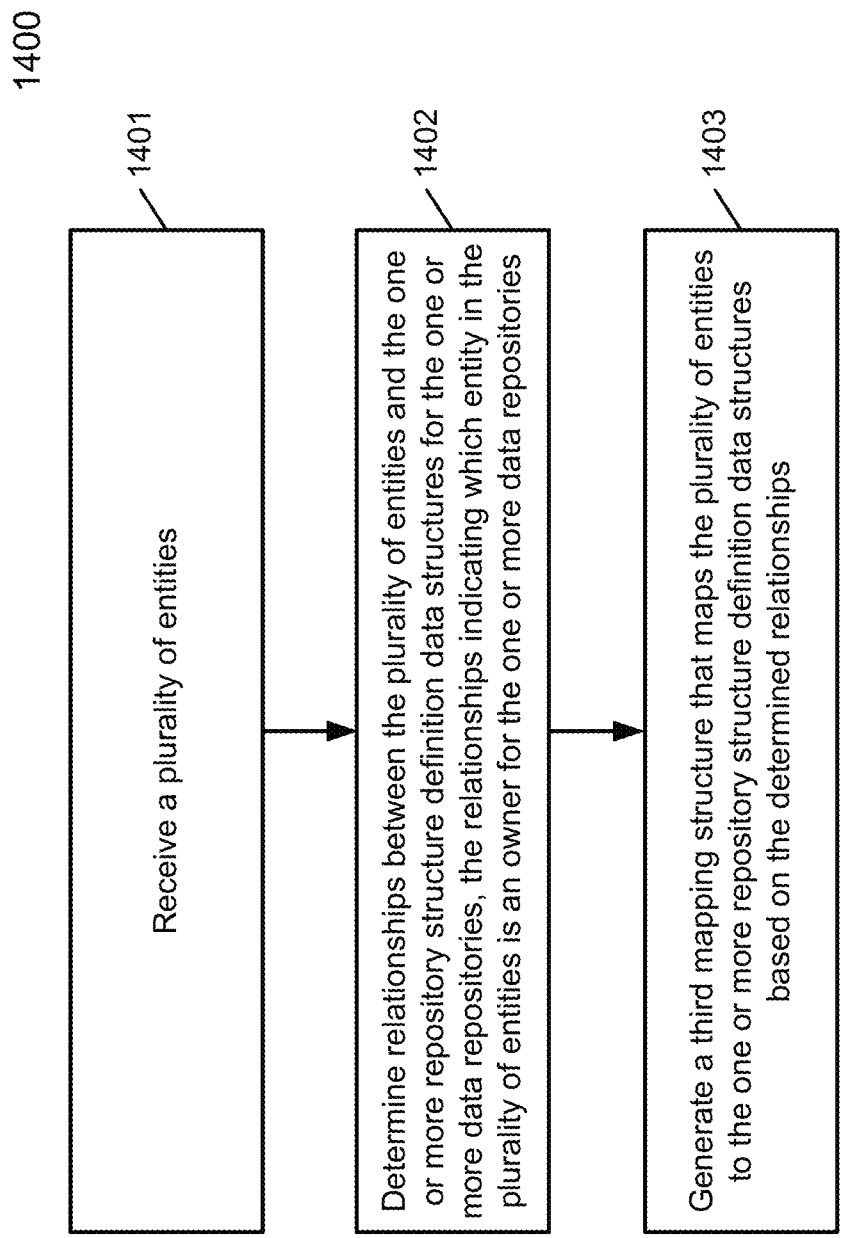
FIG. 14 is a flow diagram illustrating an example of a process to map repositories to entities according to one embodiment.

FIG. 14 is a flow diagram illustrating an example of a process to map repositories to entities according to one embodiment. Process 1400 can be performed by KO mapping engine 116 of FIG. 2, which can be performed by processing logic implemented in software, hardware, or a combination thereof. Specifically, process 1400 can be performed to map repositories to entities as shown by the connection lines between the repos and the entities in FIG. 13.

Referring to FIG. 14, at block 1401, processing logic receives a plurality of entities. The entities can be retrieved from entity store 114 of FIG. 1. The entity store can represent a user repository that keeps track of users of an enterprise. The attributes of an entity data structure can have attributes 301-304 as shown in FIG. 3.

At block 1402, processing logic determines relationships between the plurality of entities and the one or more repository structure definitions for the one or more data repositories, the relationships indicating which entity in the plurality of entities is an owner for the one or more data repositories.

At block 1403, processing logic generates a third mapping structure that maps the plurality of entities to the one or more repository structure definitions based on the determined relationships. An example of such a mapping structure is shown in FIG. 13, where the connection lines depict mapping relationships between entities and repositories.

In one embodiment, processing logic further determines an aggregate count based on the counts for one or more groups of KOs mapped under a same parent directory or root directory of a data repository. For example, a user interacting with the user interface at the reporting server can select a KO. The selection can cause the aggregate count for the KOs in the grouping to display for all repositories. The user can select the root directory of a repository or any subdirectory in the repository and an aggregate count of the KOs in the grouping would be displayed for the selected directory.

In one embodiment, processing logic further determines an aggregate count based on the counts for one or more groups of KOs mapped to a CC and associated to a particular entity based on the first, second, and third mapping structures.

In one embodiment, processing logic further performs an enforcement action including redacting underlying data in the one or more data repositories that are associated with the particular group of KO to meet a data protection compliance mandate for the CC.

In one embodiment, the plurality of types of KOs includes at least an α, β, ε, and v types of KOs, where the α type indicates a KO is a declarative type, the β type indicates a KO is a regular-expression type, the c type indicates a KO comprises at least two of α and/or β types, and the v type indicates a KO is used to perform a noise reduction operation on the underlying data.

In one embodiment, the c type further specifies a logical relationship between at least two KOs of α and/or β types.

In one embodiment, the a type and the v type have a type attribute label of lexeme for identifying a KO to be an α KO and/or a v KO.

In one embodiment, the β KO has a type attribute labeled as regular expression for identifying a KO to be a β KO.

In one embodiment, the ε KO has a type attribute labeled as expression for identifying a KO to be an ε KO.

In one embodiment, an underlying unit of structured or unstructured data is one of: a sequence of text in a file, an entry in a database, and an entry in a database schema of a database.

In one embodiment, the first mapping structure is stored using a plurality of three-tuples, where a three-tuple specifies a KO grouping, a data repository, and an aggregate count for the KO grouping in the data repository.

In one embodiment, the repository structure definition of a data repository is specified by at least a combination of: a repository class, a repository type, and a repository name for the data repository.

In one embodiment, the repository structure definition of a data repository is further specified by a repository field of the data repository if the data repository corresponds to a database.

In one embodiment, the first plurality of KOs and their storage paths are stored in one or more JSON files, wherein a KO is stored as a JSON object and a respective path is stored as a string.

In one embodiment, the first plurality of KOs and their storage paths are stored in a tree data structure or in a hash table for access of the first plurality of KOs.

In one embodiment, processing logic further performs an action including redacting, anonymizing, obfuscating, and/or encrypting underlying data corresponding to a subset of KOs to prevent inference attacks based on the first plurality of KOs.

Figure 15:
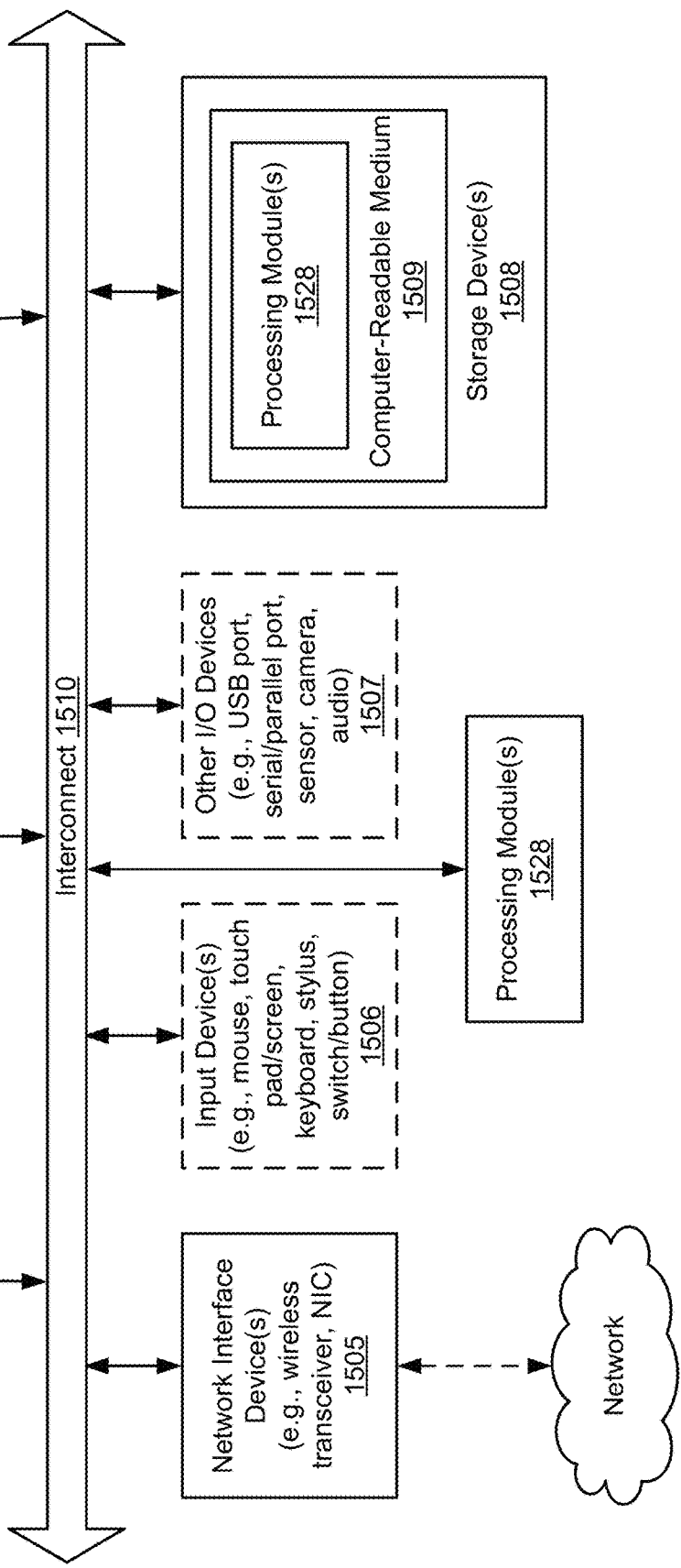
FIG. 15 is a block diagram illustrating a data processing system according to one embodiment.

FIG. 15 is a block diagram illustrating an example of a data processing system which may be used with one embodiment of the invention. For example, system 1500 may represent any of data processing systems described above performing any of the processes or methods described above, such as, for example, a client device or a server described above, such as, for example, client devices 101-102, servers 103-106 or any of engines 111 and 116, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components can be present in certain implementations and furthermore, different arrangement of the components shown can occur in other implementations. System 1500 can represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 can represent a single processor or multiple processors with a single processor core or multiple processor cores included therein. Processor 1501 can represent one or more general-purpose processors such as a microprocessor, a central processing unit (CPU), or the like. More particularly, processor 1501 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 can also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which can be a low power multi-core processor socket such as an ultra-low voltage processor, can act as a main processing unit and central hub for communication with the various components of the system. Such processor can be implemented as a system on chip (SoC). Processor 1501 is configured to execute instructions for performing the operations and steps discussed herein. System 1500 can further include a graphics interface that communicates with optional graphics subsystem 1504, which can include a display controller, a graphics processor, and/or a display device.

Processor 1501 can communicate with memory 1503, which in one embodiment can be implemented via multiple memory devices to provide for a given amount of system memory. Memory 1503 can include one or more volatile storage (or memory) devices such as random access memory (RAM), dynamic RAM (DRAM), synchronous DRAM (SDRAM), static RAM (SRAM), or other types of storage devices. Memory 1503 can store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 can further include IO devices such as devices 1505-1508, including network interface device(s) 1505, optional input device(s) 1506, and other optional IO device(s) 1507. Network interface device 1505 can include a wireless transceiver and/or a network interface card (NIC). The wireless transceiver can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC can be an Ethernet card.

Input device(s) 1506 can include a mouse, a touch pad, a touch sensitive screen (which can be integrated with display device 1504), a pointer device such as a stylus, and/or a keyboard (e.g., physical keyboard or a virtual keyboard displayed as part of a touch sensitive screen). For example, input device 1506 can include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 can include an audio device. An audio device can include a speaker and/or a microphone to facilitate voice-enabled functions, such as voice recognition, voice replication, digital recording, and/or telephony functions. Other IO devices 1507 can further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 can further include an imaging processing subsystem (e.g., a camera), which can include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 1510 via a sensor hub (not shown), while other devices such as a keyboard or thermal sensor can be controlled by an embedded controller (not shown), dependent upon the specific configuration or design of system 1500.

To provide for persistent storage of information such as data, applications, one or more operating systems and so forth, a mass storage (not shown) can also couple to processor 1501. In various embodiments, to enable a thinner and lighter system design as well as to improve system responsiveness, this mass storage can be implemented via a solid state device (SSD). However, in other embodiments, the mass storage can primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device can be coupled to processor 1501, e.g., via a serial peripheral interface (SPI). This flash device can provide for non-volatile storage of system software, including a basic input/output software (BIOS) as well as other firmware of the system.

Storage device 1508 can include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 can represent any of the components described above, such as, for example, an OD controller or an OD engine as described above. Processing module/unit/logic 1528 can also reside, completely or at least partially, within memory 1503 and/or within processor 1501 during execution thereof by data processing system 1500, memory 1503 and processor 1501 also constituting machine-accessible storage media. Processing module/unit/logic 1528 can further be transmitted or received over a network via network interface device 1505.

Computer-readable storage medium 1509 can also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components can also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures can be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described can be performed in a different order. Moreover, some operations can be performed in parallel rather than sequentially.

In the foregoing specification, embodiments of the invention have been described with reference to specific exemplary embodiments thereof. It will be evident that various modifications can be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for mapping knowledge objects to data repositories, the method comprising:
   receiving a first plurality of knowledge objects (KOs) from a KO discovery engine, each KO in the first plurality of KOs being representative of an underlying unit of structured, semi-structured, or unstructured data stored at one or more data repositories and contains no underlying structured, semi-structured, or unstructured data, each KO being one of a plurality of types of KOs, wherein a KO is associated with a set of attributes including a type attribute specifying a type of the KO, a name attribute specifying a name for the KO, and a tag attribute specifying a classification of KOs for the KO;
   receiving repository structure definition information from a repository definition store, the repository structure definition information specifying one or more repository structure definitions that define respective structures for the one or more data repositories;
   grouping the first plurality of KOs based on the name, type, tag attributes, and storage paths of the underlying unit of structured, semi-structured, and unstructured data corresponding to the KOs to generate a plurality of groups of KOs;
   for each group in the plurality of groups of KOs, determining a count of KOs in the group; and
   generating a first mapping structure mapping M to N relationships between the plurality of groups of KOs to the one or more repository structure definitions, the first mapping structure comprises the count for each respective group of KOs, wherein M and N are integer values greater than or equal to 1, wherein the first mapping structure is used for locating compliance mandated data in the one or more repositories for effective enforcement of compliance mandated actions.

2. The method of claim 1, further comprising:
   determining a compliance category (CC) from a plurality of CCs, the CC corresponding to a standard on data privacy or data protection compliance mandates;
   determining a second plurality of KOs corresponding to the CC, the second plurality of KOs being a subset of the first plurality of KOs;
   determining matching relationships between the CC to each group in the plurality of groups of KOs, the matching relationships indicating the group includes at least one KO in the second plurality of KOs; and
   generating a second mapping structure that maps M to 1 relationships between each group of the plurality of groups of KOs to the CC based on the matching relationship.

3. The method of claim 2, further comprising:
   receiving a plurality of entities;
   determining relationships between the plurality of entities and the one or more repository structure definitions for the one or more data repositories, the relationships indicating which entity in the plurality of entities is an owner for the one or more data repositories; and
   generating a third mapping structure that maps the plurality of entities to the one or more repository structure definitions based on the determined relationships.

4. The method of claim 3, further comprising: determining an aggregate count based on the counts for one or more groups of KOs mapped under a same parent directory or root directory of a data repository.

5. The method of claim 3, further comprising: determining an aggregate count based on the counts for one or more groups of KOs mapped to a CC and associated to a particular entity based on the first, second, and third mapping structures.

6. The method of claim 5, further comprising: performing an enforcement action including redacting underlying data in the one or more data repositories that are associated with the particular group of KO to meet a data protection compliance mandate for the CC.

7. The method of claim 6, wherein the plurality of types of KOs includes at least one of: α, β, ε, and v types of KOs, wherein the α type indicates a KO is a declarative type, the β type indicates a KO is a regular-expression type, the ε type indicates a KO comprises a combination of at least two of α and/or β types, and the v type indicates a KO is used to perform a noise reduction operation on the underlying data.

8. The method of claim 7, wherein the ε type further specifies a logical relationship between at least two KOs of α and/or β types.

9. The method of claim 8, wherein the α type and the v type have a type attribute label of lexeme for identifying a KO to be an α KO and/or a v KO.

10. The method of claim 9, wherein the β type has a type attribute labeled as regular expression for identifying a KO to be a β KO.

11. The method of claim 10, wherein the ε type has a type attribute labeled as expression for identifying a KO to be an ε KO.

12. The method of claim 9, wherein an underlying unit of structured, semi-structured, or unstructured data is one of: a sequence of text in a file, an entry in a database, and an entry in a database schema of a database.

13. The method of claim 10, wherein the first mapping structure is stored using a plurality of three-tuples, wherein a three-tuple specifies a KO grouping, a data repository, and an aggregate count for the KO grouping in the data repository.

14. The method of claim 11, wherein the repository structure definition of a data repository is specified by at least a combination of: a repository class, a repository type, and a repository name for the data repository.

15. The method of claim 12, wherein the repository structure definition of a data repository is further specified by a repository field of the data repository if the data repository corresponds to a database.

16. The method of claim 1, wherein the first plurality of KOs and their storage paths are stored in one or more JSON files, wherein a KO is stored as a JSON object and a respective path is stored as a string.

17. The method of claim 1, wherein the first plurality of KOs and their storage paths are stored in a tree data structure or in a hash table for access of the first plurality of KOs.

18. The method of claim 1, further comprising performing an action including anonymizing, obfuscating and/or encrypting underlying data corresponding to a subset of KOs to prevent inference attacks based on the first plurality of KOs.

19. A non-transitory machine-readable medium having instructions stored therein, which when executed by a processor, cause the processor to perform operations, the operations comprising:
receiving a first plurality of knowledge objects (KOs) from a KO discovery engine, each KO in the first plurality of KOs being representative of an underlying unit of structured, semi-structured, or unstructured data stored at one or more data repositories and contains no underlying structured, semi-structured, or unstructured data, each KO being one of a plurality of types of KOs, wherein a KO is associated with a set of attributes including a type attribute specifying a type of the KO, a name attribute specifying a name for the KO, and a tag attribute specifying a classification of KOs for the KO;
receiving repository structure definition information from a repository definition store, the repository structure definition information specifying one or more repository structure definitions that define respective structures for the one or more data repositories;
grouping the first plurality of KOs based on the name, type, tag attributes, and storage paths of the underlying unit of structured, semi-structured, and unstructured data corresponding to the KOs to generate a plurality of groups of KOs;
for each group in the plurality of groups of KOs, determining a count of units of KOs in the group; and
generating a first mapping structure mapping M to N relationships between the plurality of groups of KOs to the one or more repository structure definitions, the first mapping structure comprises the count for each respective group of KOs, wherein M and N are integer values greater than or equal to 1, wherein the first mapping structure is used for locating compliance mandated data in the one or more repositories for effective enforcement of compliance mandated actions.

20. A data processing system, comprising:
a processor; and
a memory coupled to the processor to store instructions, which when executed by the processor, cause the processor to perform operations, the operations comprising:
receiving a first plurality of knowledge objects (KOs) from a KO discovery engine, each KO in the first plurality of KOs being representative of an underlying unit of structured, semi-structured, or unstructured data stored at one or more data repositories and contains no underlying structured, semi-structured, or unstructured data, each KO being one of a plurality of types of KOs, wherein a KO is associated with a set of attributes including a type attribute specifying a type of the KO, a name attribute specifying a name for the KO, and a tag attribute specifying a classification of KOs for the KO;
receiving repository structure definition information from a repository definition store, the repository structure definition information specifying one or more repository structure definitions that define respective structures for the one or more data repositories;
grouping the first plurality of KOs based on the name, type, tag attributes, and storage paths of the underlying unit of structured, semi-structured, and unstructured data corresponding to the KOs to generate a plurality of groups of KOs;
for each group in the plurality of groups of KOs, determining a count of KOs in the group; and
generating a first mapping structure mapping M to N relationships between the plurality of groups of KOs to the one or more repository structure definitions, the first mapping structure comprises the count for each respective group of KOs, wherein M and N are integer values greater than or equal to 1, wherein the first mapping structure is used for locating compliance mandated data in the one or more repositories for effective enforcement of compliance mandated actions.

* * * * *